United States Patent [19]
Goeckler

[11] Patent Number: 5,570,137
[45] Date of Patent: Oct. 29, 1996

[54] DEVICE FOR DIGITAL DEMODULATION OF VIDEO AND AUDIO ELEMENTS OF TELEVISION SIGNAL

[75] Inventor: Heinz Goeckler, Backnang, Germany

[73] Assignee: ANT Nachrichtentechnik GmbH, Backnang, Germany

[21] Appl. No.: 439,200

[22] Filed: May 11, 1995

[30] Foreign Application Priority Data

May 20, 1994 [DE] Germany .......................... 44 17 724.0

[51] Int. Cl.⁶ .................................................. H04N 5/455
[52] U.S. Cl. ........................................ 348/726; 329/341
[58] Field of Search .................................. 348/726, 639, 348/484; 329/318, 320, 327, 341, 343; H04N 5/455

[56] References Cited

U.S. PATENT DOCUMENTS

| | | | |
|---|---|---|---|
| 4,789,897 | 12/1988 | Kappeler et al. | 348/726 |
| 4,804,924 | 2/1989 | Chassaing et al. | 348/726 |
| 4,885,546 | 12/1989 | Araki | 348/726 |
| 5,410,368 | 4/1995 | Krishnamurthy | 348/726 |

FOREIGN PATENT DOCUMENTS

| | | |
|---|---|---|
| 0062872 | 10/1982 | European Pat. Off. . |
| 3621737 | 4/1988 | Germany . |
| 3305918 | 4/1993 | Germany . |
| 4337134 | 10/1993 | Germany . |
| 4241965 | 5/1994 | Germany . |

OTHER PUBLICATIONS

IEEE Transactions on Communications, vol. 37, No. 2, Feb. 1989, pp. 159–163.
Signal Processing 9, 1985, pp. 263–276 "Equalization problems in a digital FM Receiver".
9th International Conference on Digital Satellite Communications, Copenhagen, 1992, pp. B8 247–B8 254.
Multirate Digital Signal Processing, Crochiere et al, 1983, pp. 1–35.

Primary Examiner—Victor R. Kostak
Attorney, Agent, or Firm—Michael J. Striker

[57] ABSTRACT

A device for digital demodulation of the video and audio elements of a television signal has a digital preprocessing stage for conditioning a complex digital signal for digital demodulation of a television signal at intermediate frequency, a first complex mixing device shifting the video sub-carrier to the frequency 0, a common mixing device used on the input side for the demodulation of the audio signals, and the audio signal processing is not split until after this mixing device. Therefore, fully digital signal processing is possible for television signals from the intermediate frequency, with limited filter complexity.

24 Claims, 4 Drawing Sheets 5,570,137

DEVICE FOR DIGITAL DEMODULATION OF VIDEO AND AUDIO ELEMENTS OF TELEVISION SIGNAL

BACKGROUND OF THE INVENTION

The invention relates to a device for digital demodulation of the video and audio elements of a television signal which is at intermediate frequency.

From DE 33 05 918 C2, it is known for a television signal at intermediate frequency to be sampled by means of an A/D converter, and for the further processing, in particular the demodulation, to be carried out digitally. The frequency of the sampling signal is in this case less than twice the carrier frequency.

EP 62 872 B1 discloses the signal processing of a sampled intermediate-frequency signal as a complex digital signal.

The older patent application P 43 37 134 discloses a method for conditioning a digital frequency-multiplexed signal from television channel signals. The channel signals are oversampled, filtered by means of a complex half-band filter, and shifted in frequency by means of a complex mixer for further processing.

SUMMARY OF THE INVENTION

The object of the present invention is to specify a cost-effective device for the digital demodulation of the video and audio elements.

In keeping with these objects and with others which will become apparent hereinafter, one feature of the present invention resides, briefly stated, in a device for digital demodulation of video and audio elements of a television signal which is at intermediate frequency which has a digital preprocessing stage formed so that a television signal in digital form is converted into a complex digital signal which is shiftable spectrally such that a mid-frequency of the complex digital signal appears at a frequency 0, a first complex mixing device provided for the complex digital signal and having a mixing frequency selected such that a video sub-carrier appears at the frequency 0 after mixing, a digital demodulator for video element of the complex digital signal which is mixed by means of the first complex mixing device; a digital demodulator provided for audio elements of the complex digital signal and having an input side, a second complex mixing device provided on the input side of the digital demodulator for the audio elements and having complex carrier oscillation derived from the first complex mixing device, the second complex mixing device having a signal output and a mixing frequency selected such that an original video sub-carrier frequency which is offset by arithmetic mean of audio sub-carrier frequencies appears at the frequency 0 at the signal output of the second complex mixing device.

The device according to the invention has the advantage that the splitting of the audio signals into separate paths is carried out as late as possible, at as low a sampling frequency as possible. This reduces the filter complexity. The structure of the audio-FM demodulators can be matched to conventional VHF-FM demodulators.

The complex carrier oscillation for the conversion, which is carried out first, of the audio signals can be derived easily in a phase-locked manner from the conversion stage for the video signal. Only one frequency control loop or phase locked loop, which has a short loop delay, is thus necessary for audio signal demodulation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
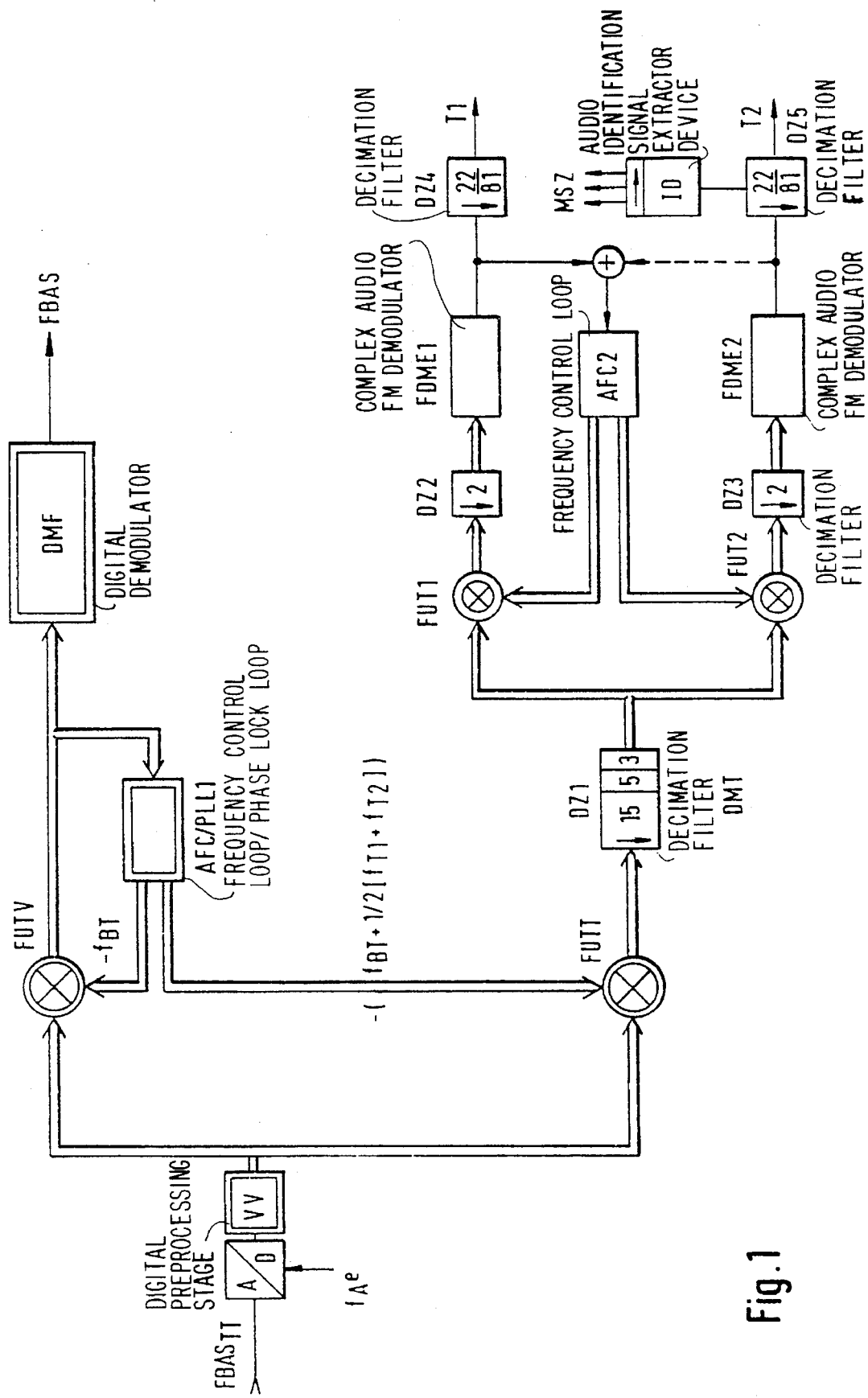
FIG. 1 shows a block diagram of a device according to the invention.

The block diagram according to FIG. 1 shows the individual assemblies of a device for digital demodulation of the video and audio elements of an analog television signal $FBAS_{TT}$ which uses a sampling unit—A/D converter—for closing sampling of the television signal (CCIR Standard) which is present at intermediate frequency and has a video sub-carrier of 38.9 MHz. If the television signal at intermediate frequency is already a digital signal, the sampling unit may be omitted. The sampling frequency is peferably $f_A^e = 28.2763$ MHz.

Figure 2A:
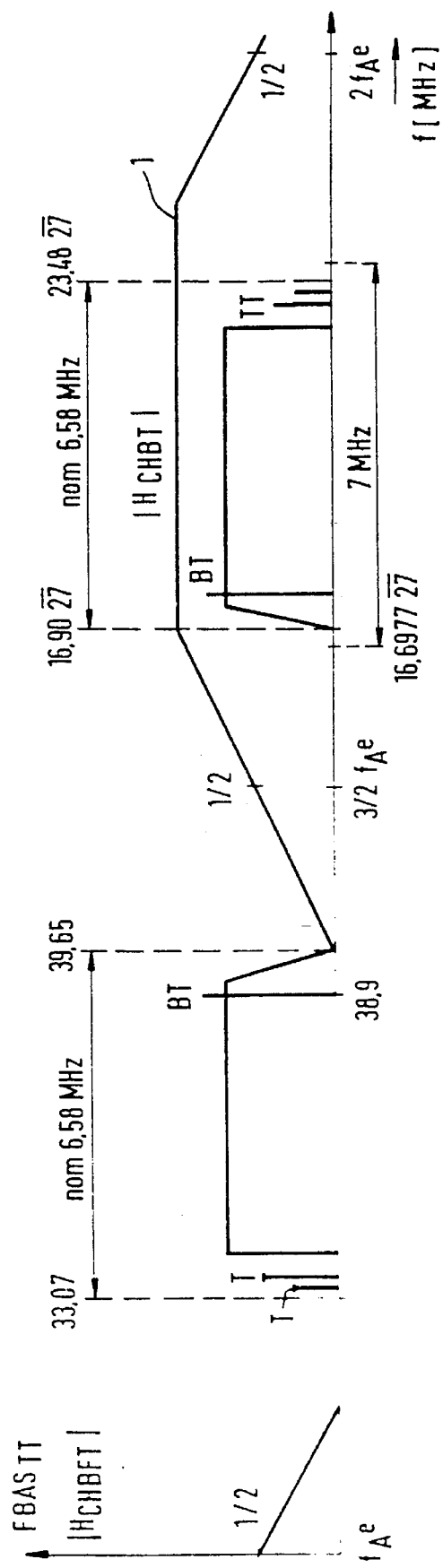
FIG. 2 shows the signal spectrum of the television signal before and after sampling.
Figure 2B:
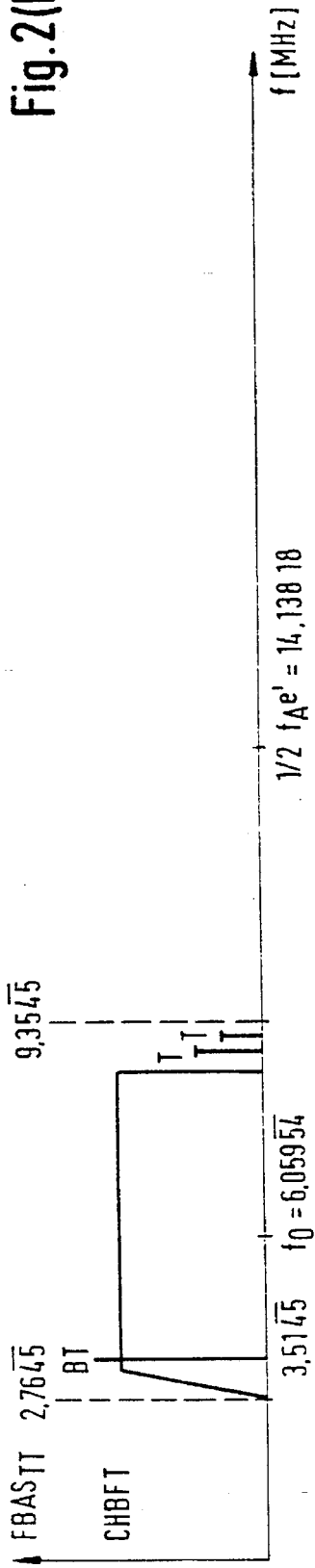

FIG. 2 shows the television signal before and after sampling (a) and after filtering and decimation (b). The sampled television signal is converted by means of a digital preprocessing stage VV into a complex digital signal, and is spectrally shifted such that the mid-frequency of the complex digital signal appears at the frequency 0. For clarity, where the digital signal is present in complex form, the corresponding signal paths and assemblies are designated by double lines in the Figures.

The sampling at $f_A^e = 28.2763$ MHz is preconditional on adequate band limiting being achieved by means of an upstream analog IF filter. If no such IF filter is provided, an antialiasing filter AAF should be connected upstream, which limits the television signal to the useful bandwidth B such that no spectral overlaps or convolutions with the useful spectrum or its image frequencies is produced by sampling at a sampling rate $f_A^e > 2B$. After the analog/digital conversion A/D, the television signal is oversampled at $f_A$ in order then to be filtered and decimated subsequently using a complex digital filter CHBFT by sampling at $f_A = f_A^{e/2} = 14.1381$ MHz.

The complex digital filter CHBFT extracts the signal spectrum in the normal position as is required for the subsequent TV demodulation.

The complex digital filter CHBFT is preferably designed as an L-band filter (complex Nyquist filter), L being an integer decimation factor. In the case of a complex Nyquist filter, the central coefficient for the most advantageous case in terms of complexity is real 1/L or purely imaginary j/L. The central coefficient becomes ½ or j/2, respectively, (half-band filter), using a decimation factor of L=2, which reverses the previous oversampling by the sampling unit A/D by the factor 2 again.

Figure 3:
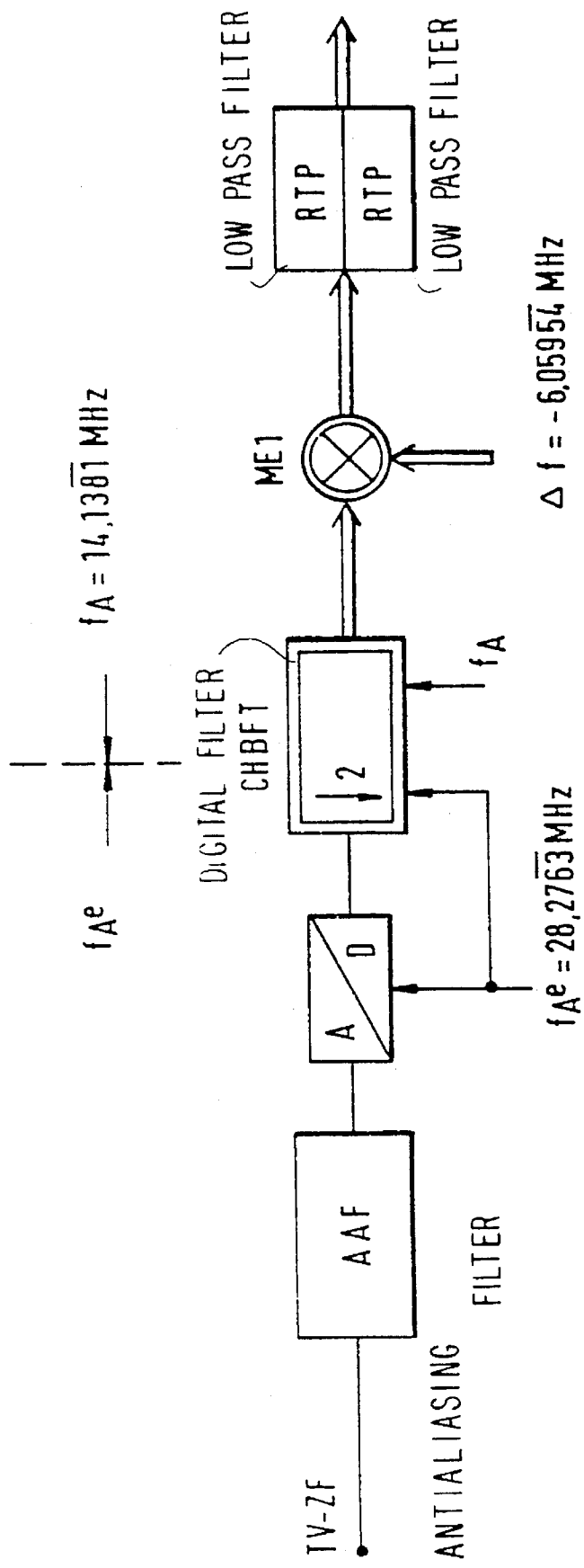
FIG. 3 shows the design of the digital preprocessing stage.

FIG. 3 shows the assemblies of the preprocessing stage in detail. This design partially corresponds with the implementation according to P 43 37 134. The principle of the complex half-band filter CHBFT is described, per se, in German Patent 36 21 737. The magnitude of the transfer function of the complex half-band filter $|H_{CHBFT}|$ is illustrated in FIG. 2, together with the sampling frequencies $f_A^e$ or $f_A$ and the band limits. The respective frequency of the video sub-carrier is designated by BT, and the frequency of the audio sub-carrier by TT. A complex mixing device ME1, to which a mixing frequency of $f_0$=6.05954 MHz is supplied, is provided for frequency shifting of the complex digital signal in such a manner that the mid-frequency of the complex digital signal appears at the frequency 0 or $f_{BT}$=−2.545 MHz, as in the case of the implementation according to P 43 37 134, at the output of the complex half-band filter CHBFT. The output signal of the complex mixing device ME1 is supplied to a pair of identical low-pass filters RTP having real coefficients, which filters can be implemented recursively or non-recursively. One low-pass filter is provided for the real part and the other for the imaginary part of the complex signal to be processed. Such a pair of filters having real coefficients—there is thus no coupling over from the real part to the imaginary part or vice versa—can therefore be used for filtering of the complex signal since the mid-frequency of the spectrum of the complex (time) signal is f=0. These low-pass filters can be implemented at low cost as a linear-phase FIR filters. An adjacent channel selection of $a_s$=75 dB can be achieved using a filtering level of N=105 for the RTP pair of filters.

The output signal of the preprocessing stage VV is now further processed in two paths to be precise in a first path for the video demodulation and in a common second part for the two audio signals T1 and T2. A first complex mixing device FUTV, whose mixing frequency is selected such that the video sub-carrier $f_{BT}$ appears at the frequency 0 after mixing, is provided in the first path. The complex mixing device is followed by a complex digital demodulator DMF for the video element of the television signal, by means of which the composite video signal is extracted at 14.13818 MHz. The complex mixing device FUTV is equipped with a frequency control loop and/or phase locked loop AFC/PLL1, which makes it possible for the video sub-carrier BT to occur exactly at the frequency 0 and to have the correct phase (locked-in state).

Provided in the second path is a digital demodulator DMT for the audio elements, which demodulator DMT firstly has a second complex mixing device FUTT for common processing of the audio signals (two audio sub-carriers TT are assumed in the example), with respect to the preprocessing stage VV. The complex carrier oscillation of the mixing device FUTT is derived from the carrier oscillation of the mixing device FUTV. In the exemplary embodiment which is illustrated in FIG. 1, the frequency control loop and/or phase lock loop AFC/PLL1 is designed such that the video sub-carrier frequency $f_{BT}$ for the mixing device FUTV appears at its first output, and the video sub-carrier frequency $f_{BT}$+½ $[f_{T1}+f_{T2}]$, which is offset by the arithmetic mean of the two audio sub-carrier frequencies $f_{T1}$ and $f_{T2}$, appears at its second output.

Figure 4:
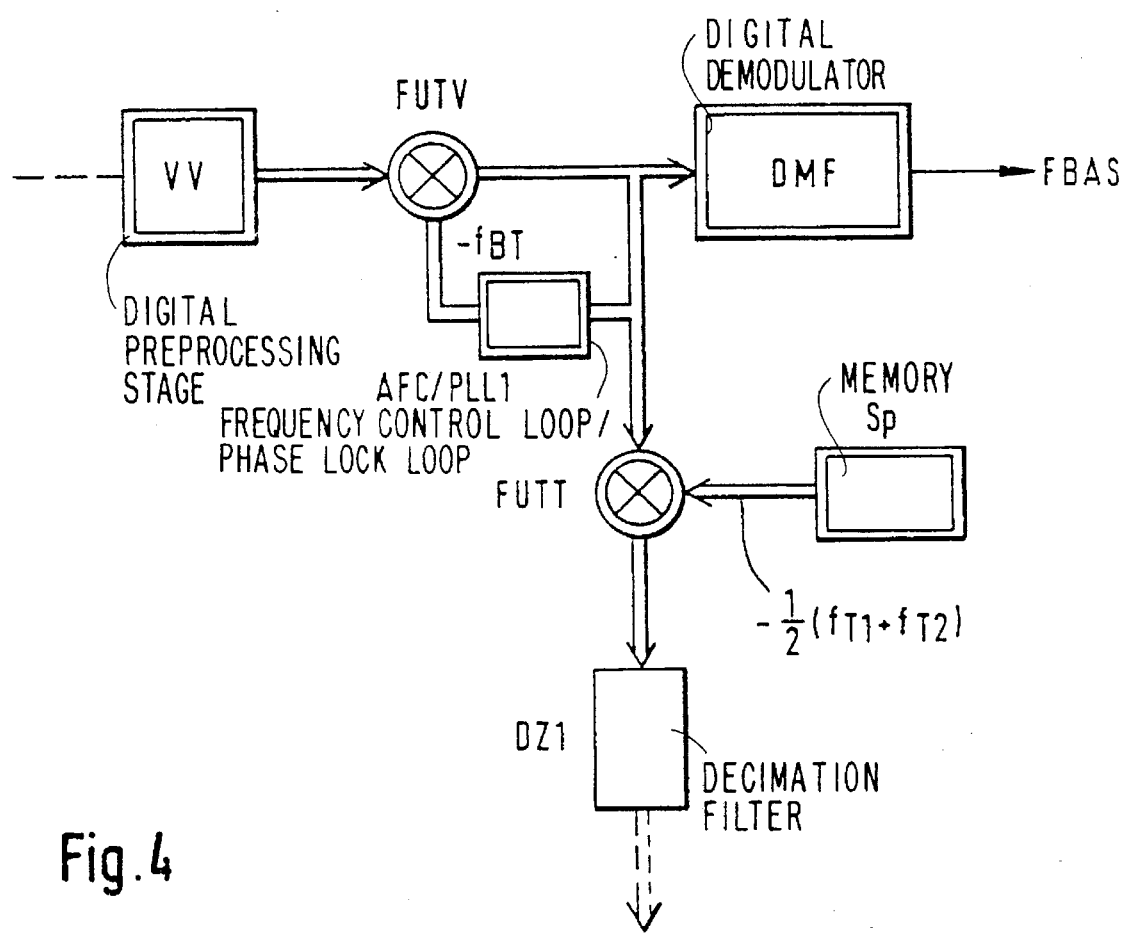
FIG. 4 shows a variant of FIG. 1 with different mixing frequency conditioning.

In an alternative solution, illustrated in FIG. 4, the complex carrier oscillation $f_{BT}$+½ $[f_{T1}+f_{T2}]$ for the mixing device FUTT is not derived via the frequency control loop and/or phase locked loop AFC/PLL1, but the output signal of the mixing device FUTV is mixed, with the addition of the complex carrier, with the frequency of the arithmetic mean ½ $(f_{T1}+f_{T2})$ of the audio sub-carrier frequencies $f_{T1}$ and $f_{T2}$. This complex carrier oscillation can be carried out by conversion of the real audio sub-carrier into the complex domain, or using the known Weaver method. In the simplest case, a memory device Sp having a sin/cos table is used for this purpose. The memory device can be designed either as ROM or as a RAM standard chip, where the samples of the sin/cos values are stored either permanently or variably.

The output of the mixing device FUTT leads to a decimation filter device DZ1, which carries out a sampling rate conversion by Q=1/M, M being a natural number, for example 15, that is to say from 14.3818 MHz to 942.54 kHz. This decimation filter device can be designed analogously to the decimation filter device according to German Patent 36 21 737. Such decimation filter devices are also generally described in Multirate Digital Signal Processing by R. E. Crochiere and L. R. Rabiner, Prentice-Hall Inc., Englewood Cliffs, N.J. U.S.A. Recursive or non-recursive FIR filters are possible, which can be implemented efficiently as polyphase filters. The decimation is preferably carried out in two stages using the decimation factors 5 and 3. The output signal of the decimation filter device DZ1 is supplied in parallel paths in each case separately for the two audio signals T1 and T2 to a third and a fourth complex mixing device FUT1 and FUT2 respectively. As is still to be explained, the carrier oscillations for the two mixing devices FUT1 and FUT2 can be derived jointly. The two mixing devices FUT1 and FUT2 have in each case one decimation filter device DZ2 and DZ3 respectively connected downstream of them for sampling rate conversion by the factor 2, that is to say to 471.27 kHz. This is in each case followed by a complex audio-FM modulator FMDE1 or FMDE2 respectively, for in each case one of the audio signals T1, T2.

Such complex audio-FM demodulators having complex input signals and real output signals are known per se (Signal Processing 9, 1985, North Holland, pages 263–276 "Equalization Problems in a Digital FM Receiver"; DE 42 41 965.4) and thus do not need to be explained in more detail. At least one frequency control loop AFC2 of at least first order is provided to derive the mixing frequencies at the correct frequency for the third and fourth mixing devices FUT1 and FUT2 respectively. Alternatively, a combined frequency control loop and phase locked loop can also be provided. The frequency control loop AFC2 can be implemented using a frequency error detector in accordance with IEEE Transactions on Communications, Vol. 37, No. 2, 1989, pages 159–163. The frequency control loops AFC processes the output signal of at least one of the two FM demodulators FMDE1 and FMDE2 respectively to form two complex carrier oscillations at the frequency +½ $(f_{BT}+f_{T1})$ or −½ $(f_{BT}+f_{T2})$ which are produced from the differences between the two audio sub-carrier frequencies, but whose mathematical signs are different. Sin/cos tables are once again stored in the frequency control loop, in order to produce complex carrier oscillations from the real output signal or signals. The complexity is lower than separate audio processing in accordance with application BK 93/83 of the applicant. Only one decimation filter is necessary for decimation by the factor 15. Only one AFC loop is likewise necessary for the demodulation of the two audio sub-carriers T1 and T2, which loop, in addition, also manages with one sin/cos table. (The frequency and thus the phase differ only by the mathematical sign). Furthermore, the AFC loop has a short loop delay. Only one decimation by the decimation factor 22/81 is in each case still required to obtain digital audio signals at standardized sampling frequencies, for example 32 kHz. The decimation filter devices DZ4 and DZ5 are provided for this purpose, which preferably first decimate by the factor 2 and then by the factor 11/81.

A device ID, which is preferably connected to one of the further or additional decimation filter devices DZ2, DZ3 DZ4, DZ5 is provided for extraction of any audio identification signals MSZ which may be provided (mono, stereo, two-channel or multiple channel). A particularly advantageous implementation of the ID device with little complexity is that described in the application BK 93/96 of the applicant.

The solution according to the International Conference on Digital Satellite Communications, Copenhagen, May 1992, pages B247–B254 can be used in principle for the frequency control loop and/or phase locked loop AFC/PLL1. However, the use of the solution indicated in the application BK 93/88 of the applicant is particularly advantageous.

A known solution, for example according to DE 33 05 918 C2, is suitable as the demodulator DMF for the video element.

A particularly advantageous demodulator for the processing of the video element is described in the application BK 93/26 of the applicant.

It will be understood that each of the elements described above, or two or more together, may also find a useful application in other types of constructions differing from the types described above.

While the invention has been illustrated and described as embodied in a device for digital demodulation of video and audio elements of television signal, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for digital demodulation of video and audio elements of a television signal which is at intermediate frequency, comprising a digital preprocessing stage formed so that a television signal in digital form is converted into a complex digital signal which is shiftable spectrally such that a mid-frequency of the complex digital signal appears at a frequency 0; a first complex mixing device provided for the complex digital signal and having a mixing frequency selected such that a video sub-carrier appears at the frequency 0 after mixing; a digital demodulator for video element of the complex digital signal which is mixed by said first complex mixing device; a digital demodulator provided for audio elements of the complex digital signal and having an input side; a second complex mixing device provided on said input side of said digital demodulator for the audio elements and having complex carrier oscillation derived from said first complex mixing device, said second complex mixing device having a signal output and a mixing frequency selected such that an original video sub-carrier frequency which is offset by an arithmetic mean of audio sub-carrier frequencies appears at the frequency 0 at said signal output of said second complex mixing device.

2. A device as defined in claim 1; and further comprising a sampling unit for sampling of the television signal at intermediate frequency to present the television signal in digital form at intermediate frequency and to supply it to said digital preprocessing stage.

3. A device as defined in claim 1; and further comprising a decimation filter device connected downstream of said second complex mixing device for conversion of the complex audio element signals to a lower sampling frequency.

4. A device as defined in claim 3, wherein said decimation filter device is formed so that it converts the complex audio element signals to the lower sampling frequency of 1/M of an output sampling frequency of said digital preprocessing stage, wherein M is a natural number.

5. A device as defined in claim 4, wherein said decimation filter device is formed so as to convert the complex audio element signals to the lower sampling frequency of 1/M of the output sampling frequency of said digital preprocessing stage, wherein M is 15.

6. A device as defined in claim 1; and further comprising a third mixing device and a fourth mixing device, said output of said second complex mixing device being connected with inputs of said third and fourth mixing devices respectively, said third and fourth complex mixing devices having mixing frequencies selected such that mid-frequencies of FM-modulated audio sub-carriers appear at a frequency 0 after mixing.

7. A device as defined in claim 6; and further comprising a decimation filter device connected downstream of said second complex mixing device for conversion of the complex audio element signals to a lower sampling frequency, said output of said second complex mixing device being connected to said inputs of said third and fourth mixing devices respectively via said decimation filter device.

8. A device as defined in claim 6; and further comprising digital output audio-FM demodulators each connected downstream of said third and fourth mixing devices.

9. A device as defined in claim 8; and further comprising an intermediate decimation filter device through which each of said third and fourth mixing devices is connected with a respective one of said digital audio-FM demodulators.

10. A device as defined in claim 8, wherein said digital audio-FM demodulators are formed so that they convert a complex input signal into a real output signal.

11. A device as defined in claim 6; and further comprising at least one frequency control loop provided for deriving the mixing frequencies of said third and fourth mixing devices.

12. A device as defined in claim 6; and further comprising at least one phase locked loop provided for deriving the mixing frequencies of said third and fourth mixing devices.

13. A device as defined in claim 6, wherein said mixing devices are formed so that a reference frequency of at least one of said second, third and fourth mixing devices is derived from an output signal of said first complex mixing device.

14. A device as defined in claim 6, wherein said mixing devices are formed so that a reference frequency of at least one of said second, third and fourth mixing devices is derived from a signal of frequency control loop.

15. A device as defined in claim 6, wherein said mixing devices are formed so that a reference frequency of at least one of said second, third and fourth mixing devices is derived from a signal of a phase locked loop.

16. A device as defined in claim 8; and further comprising at least one of a frequency control loop and a phase locked loop for deriving mixing frequencies of said third and fourth mixing devices, said frequency control loop and said phase control loop of said third and fourth mixing devices being formed so as to produce one complex conversion signal for said third and fourth mixing devices from at least one of output signals of said audio-FM demodulators, which conversion signal is derived from differences between the audio sub-carrier frequencies.

17. A device as defined in claim 8; and further comprising additional decimation filter devices each connected downstream of respective one of said audio-FM demodulators for reducing the sampling frequency, said additional decimation filter devices having a decimation factor selected such that standardized sampling frequencies are achieved for digitally demodulated audio signals.

18. A device as defined in claim 6, wherein said the decimation factor of said decimation filter devices is selected so that sampling frequencies of 32 kHz are achieved for the digitally demodulated audio signals.

19. A device as defined in claim 8; and further comprising a device for extraction of audio identification signals.

20. A device as defined in claim 19; and further comprising additional decimation filter devices arranged so that said device for extraction of audio identification signals is connected to one of said additional decimation filter devices.

21. A device as defined in claim 2, wherein said sampling unit is formed so that an analog real television signal is sampled with an oversampling factor of at least two, related to a useful bandwidth of the television signal at intermediate frequency.

22. A device as defined in claim 21, wherein said digital preprocessing stage includes a decimation filter device for decimating the complex digital signal which is conditioned in said decimation filter device, by a factor which corresponds to the oversampling factor of said sampling unit.

23. A device as defined in claim 1, wherein said digital preprocessing stage has a digital filter for conversion of the sampled real television signal into the complex digital signal.

24. A device as defined in claim 23, wherein said digital signal has a complex L-band filter, wherein L designates an integer decimation factor.

* * * * *